United States Patent [19]
Roberts et al.

[11] Patent Number: 4,957,405
[45] Date of Patent: Sep. 18, 1990

[54] APPARATUS FOR MINING

[75] Inventors: Margaret A. Roberts, Morgantown; Harry J. Brown, Barrackville, both of W. Va.

[73] Assignee: Consolidation Coal Company, Pittsburgh, Pa.

[21] Appl. No.: 248,661

[22] Filed: Sep. 26, 1988

[51] Int. Cl.$^5$ .............................................. B65G 67/08
[52] U.S. Cl. .................................. 414/339; 198/594; 198/861.1; 198/861.2; 414/398; 414/133
[58] Field of Search ................ 414/339, 344, 502–505, 414/334, 336, 528, 348, 353, 133, 527; 198/861.1, 861.2, 594

[56] References Cited

U.S. PATENT DOCUMENTS

| | | |
|---|---|---|
| 2,269,078 | 1/1942 | Cartlidge . |
| 2,642,984 | 6/1953 | Mercier .................... 198/861.1 X |
| 2,715,502 | 8/1955 | McCarthy .................... 198/594 X |
| 2,724,515 | 11/1955 | Scheuchzer et al. ................ 414/339 |
| 2,796,999 | 6/1957 | Russell ................ 414/398 |
| 3,167,193 | 1/1965 | Klosk ................ 414/339 X |
| 3,722,477 | 3/1973 | Weldy et al. ................ 198/861.2 X |
| 4,798,279 | 1/1989 | Doerr et al. ................ 198/861.1 X |

FOREIGN PATENT DOCUMENTS

| | | | |
|---|---|---|---|
| 142430 | 10/1953 | Switzerland ........................ 198/594 |
| 1373170 | 11/1974 | United Kingdom . |
| 2103559 | 2/1983 | United Kingdom ............. 198/861.2 |

*Primary Examiner*—Frank E. Werner
*Attorney, Agent, or Firm*—Alan N. McCartney

[57] ABSTRACT

An apparatus using a miner, tramming conveyor and cart-type belt system wherein the system has a plurality of interconnected rail mounted carts having a lower portion supporting a panel belt and an upper portion for supporting the conveyor in both a conveying and a tramming mode.

2 Claims, 2 Drawing Sheets

APPARATUS FOR MINING

BACKGROUND OF THE INVENTION

1. Field of the Invention

This invention relates to a method and apparatus for mining which utilizes a continuous miner, tramming conveyor and a carrier for the panel belt which has an elevated rail system for supporting the tramming conveyor over the panel belt.

2. Summary of the Prior Art

One conventional method of mining utilizes a continuous miner which deposits the mined material into carts which transport the material to a panel belt which conveys the mined material out of the mine. Various methods and apparatus have been developed to expedite moving the mined material, such as coal, from the miner at the mine face back to the panel belt. U.S. Pat. No. 3,422,949 discloses a wheel mounted mobile conveyor for transporting mined material from the miner to a belt conveyor. U.S. Pat. No. 4,339,031 discloses an overhead rail articulated conveyor for material transport, the conveyor sections being pivotally interconnected to permit the conveyor to traverse a curvilinear path around the pillars supporting the mined out section.

Other methods of conveying the coal from the miner to the panel belt include conveyor units supporting a conveyor belt which transports the coal. U.S. Pat. Nos. 1,932,897; 1,999,932 and 4,476,975 illustrate this general type of mining scheme.

SUMMARY OF THE INVENTION

It is the purpose of this invention to provide a flexible conveyor train between a miner and a panel belt with the panel belt being carried on carts supported on the mine floor. The conveyor train is supported on the mine floor at the forward end and is supported on the carts at the rearward end.

It is an object of this invention to provide a method of mining incorporating a continuous miner which deposits mined material on a tramming conveyor having a rearward end supported on carts carrying a panel belt for transporting the mined material, the tramming conveyor having a plurality of separate pivotally interconnected conveyor units which can be raised and lowered. The conveyor units support conveyor flights which transport coal when the conveyor units are in the raised position and transport the conveying units along the mine floor and on the carts in the lowered position.

It is also an object of this invention to provide an interconnection between a panel belt carrying floor supported structure and a tramming conveyor which permits the conveyor to transport coal to the panel belt and also move on the floor supported structure.

It is a further object to provide in a mining scheme support carts carrying a panel belt, with the carts containing elevated side rails to support a tramming conveyor and cross supports to permit movement of the conveyor on the carts.

It is an additional object of this invention to provide a low profile belt continuous haulage system wherein a cart mounted belt system interfaces with a tramming conveyor that can move back and forth on the carts to dump material directly onto the belt running through the carts. The cart-type structure can be supported on rubber tired wheels or rail-type wheels carried on light weight rail mine gage track mounted on the mine floor. An overhead rail system carries the supports for the cable and hose used with the various mining equipment.

DESCRIPTION OF THE PREFERRED EMBODIMENT

Figure 1:
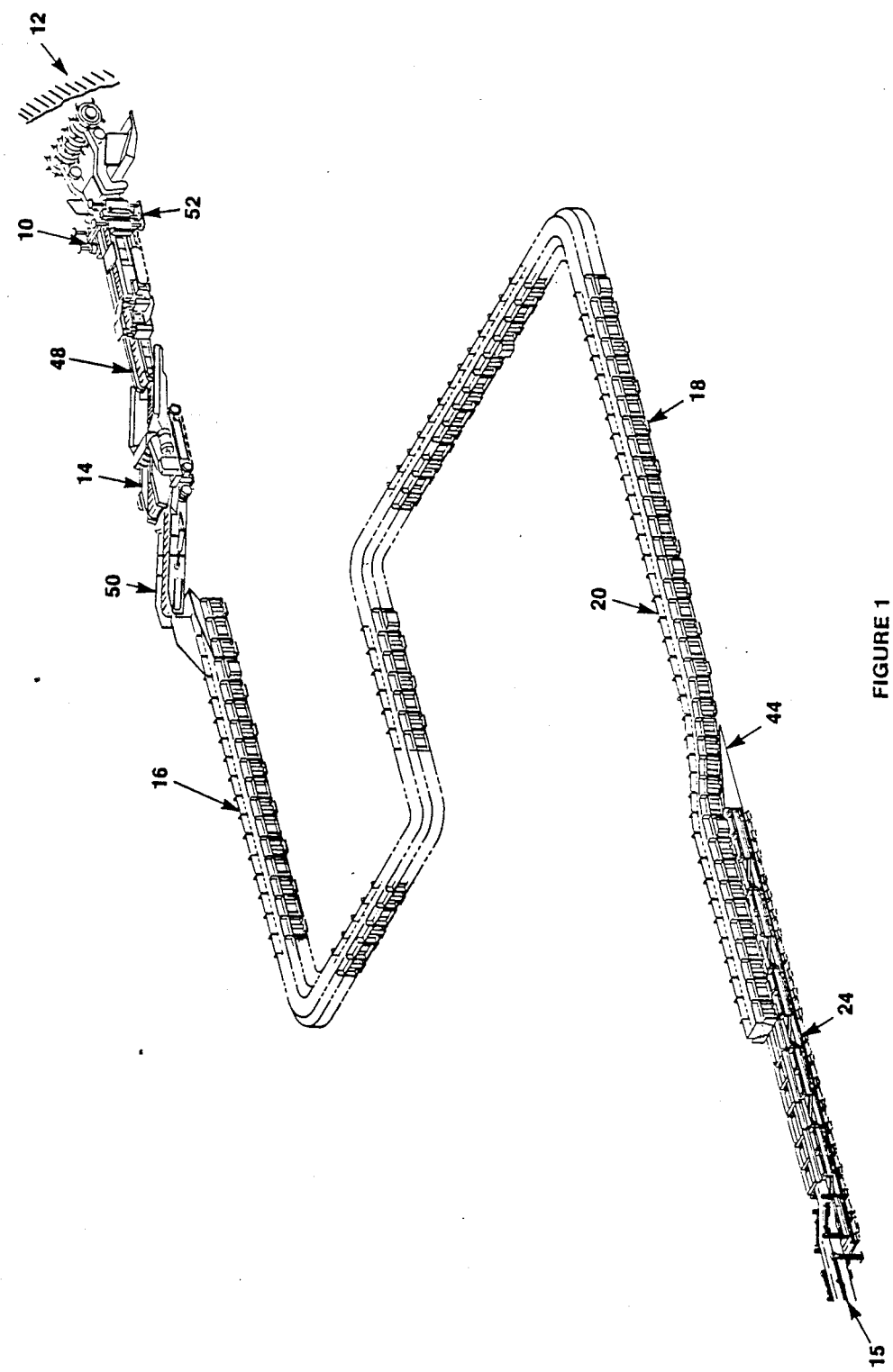
FIG. 1 is a perspective view of the overall mining system illustrating the miner, a rock crusher, tramming conveyor and the belt carrying elevated cart system.

Attention is directed to FIG. 1 which illustrates the mining scheme of this invention. A continuous miner 10 removes the material from the face 12 and the rock crusher 14 deposits the material on the tramming conveyor 16 which transports the mined material to the panel belt 15 for transport out of the mine. (A tramming conveyor of the type referred to is illustrated in the commonly owned U.S. Pat. No. 4,773,520.)

The tramming conveyor 16 comprises a plurality of pivotally interconnected conveyor units 18 supporting a continuous conveyor having flights 20. (Mounted on the conveyor is a drive unit, not shown, for driving the conveyor). The conveyor units (See FIG. 2) have outboard cylinders 22 permitting the units to be raised to convey material and be lowered to permit the flights 20, when driven, to tram the entire conveyor 16 along the mine floor as the miner advances into the face. As illustrated in FIG. 1, this arrangement permits the conveyor 16 to articulate through the mined entry and continuously haul material from the miner to the panel belt. Mounted in the mine roof are rail mounted supports 17 for carrying the cables and hoses necessary for operation of the mine equipment.

Figure 2:
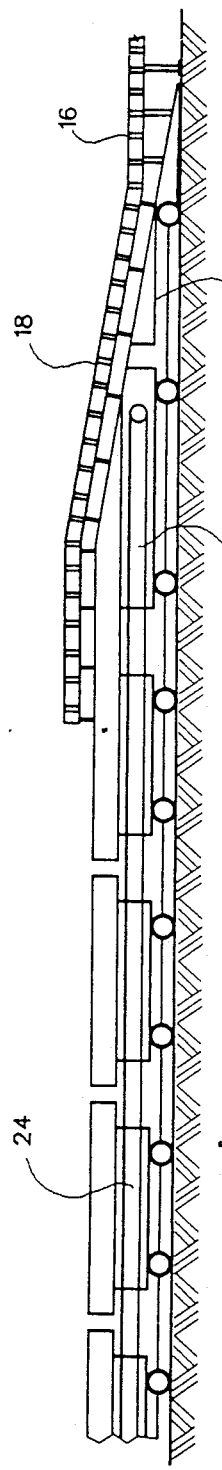
FIG. 2 is a side elevational view of the interconnection of the tramming conveyor and the cart-type belt structure; and, FIG. 3 is a diagramatic view of the tramming conveyor mounted on the elevated cart-type belt structure.
Figure 3:
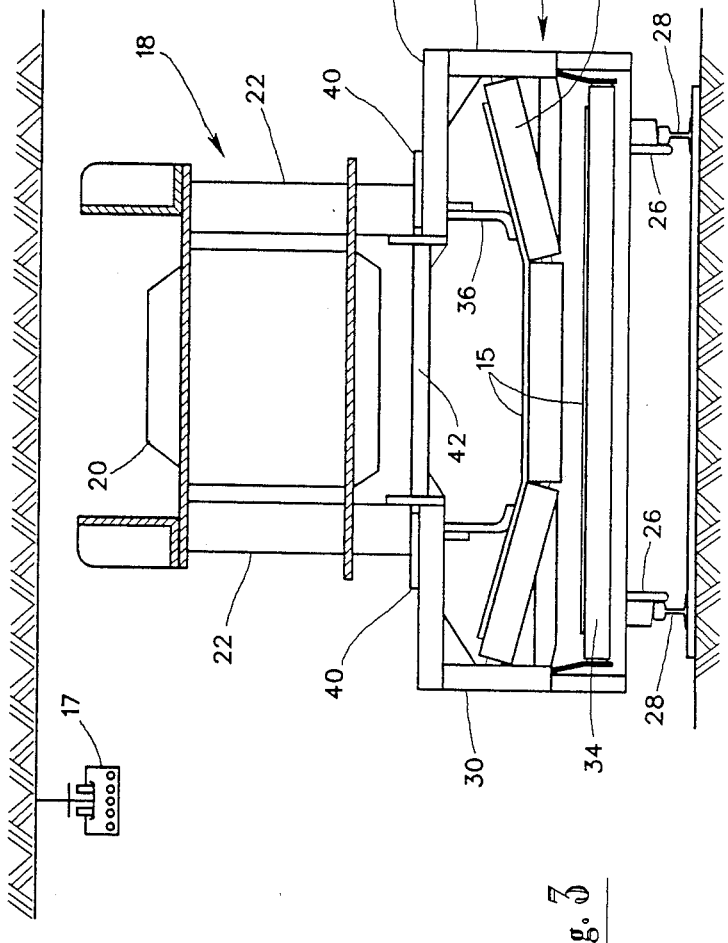

Attention is now directed to FIGS. 2 and 3 which illustrate the interface between the tramming conveyor 16 and the panel belt 15. A plurality of pivotally interconnected carts 24 have track type wheels 26 carried on rail tracks 28 mounted on the mine floor (it should be noted the carts 24 could be mounted on rubber tired chassis for mobile movement over the mine floor). The side supports 30 of carts 24 carry upper and lower rollers 32, 34 which support the panel belt 15. Guides 36 on upper cart support 38 contain the mined material on the panel belt. The supports 38 carry longitudinally extending spaced side rails 40 interconnected by spaced cross supports 42.

At the forward end of train formed by the cart type belt structure are rail mounted ramps 44 (See FIG. 2). With this arrangement, the self-propelled tramming conveyor, in its lowered position, can be driven by the conveyor flights 20 contacting the mine floor and the supports 42 on the carts to drive the conveyor back and forth as required during the mining scheme. As the conveyor 16 is positioned on the carts, the cylinders 22 will contact the side rails 40 (See FIG. 3) to raise the conveyor in preparation for a mining sequence. As the miner moves forward, the conveyor 16 remains stationary and the miner can advance the length of combined overlap of the conveyor chutes 48, 50 of the miner and rock crusher. Thereafter, the conveyor 16 can be lowered and advanced on the carts the required distance for proper spacing with the miner and crusher. At this time, the roof bolters 52 on the miner can be activated. Further, as the miner, crusher and conveyor are retreated to develop new entries, the conveyor 16 can be trammed up on the carts the required distance for developing a new mining sequence.

It can thus be seen with this conveyor-cart type belt structure interface, the cart track provides a means to advance the panel belt and continuous haulage system in the entry, a means to resist side loads to keep the system centered in the entry heading and a means to transport the tramming conveyor through the mine. In this latter mode, the conveyor 16 can be trammed entirely up on the carts and the crusher or other equipment can pull the system to any desired location in the mine.

With the conveyor-cart interconnection thus described, the conveyor cylinders are outboard of the longitudinal supports in the conveying mode and the flights are inboard of the longitudinal supports in the tramming mode. In this arrangement, the conveyor 16 can go up the elevated roadway formed by the longitudinal supports and be positioned above the panel belt.

We claim:

1. In a mining system having a self-propelled tramming conveyor for receiving mined material and depositing the material onto a cart type panel belt support structure comprising
   a. the conveyor being self-propelled and having a plurality of pivotally interconnected units supporting continuous conveyor carrying driven flights, said units having outboard cylinders for lowering and raising said units so that said flights tram said conveyor to transport said conveyor in the unit lowered position and convey material in the unit raised position,
   b. the cart type panel belt support having a plurality of pivotally interconnected mobile carts having a lower portion supporting a continuous material conveyor and an elevated upper portion for receipt of said tramming conveyor, so that the mined material can be deposited from said conveyor onto said panel belt.
   c. said cart lower portion has upper and lower conveyor belt supporting rollers with said cart lower portion carrying guides for retaining mined material on said conveyor,
   d. said carts each having an upper portion with outboard longitudinally extending opposed rails for receipt of said outboard cylinders enabling said cylinders to raise and lower said tramming conveyor on said carts,
   e. said carts also each having cross supports extending between said rails for supporting said conveyor flights in the lowered position enabling said conveyor flights to be driven along said cross supports on said carts, whereby said cylinders are positioned on said rails when said tramming conveyor is depositing material on said panel belt and said conveyor flights are inboard of said rails when said tramming conveyor is being driven on said carts.

2. The system of claim 1 including a rail mounted ramp positioned forward of said carts to provide an incline for entrance and exit of the tramming conveyor from said carts.

* * * * *